United States Patent [19]

Matsumoto et al.

[11] 4,218,823
[45] Aug. 26, 1980

[54] DIGITAL MICROMETER

[75] Inventors: Sakuzo Matsumoto, Hachioji; Taizo Morimoto, Tokyo; Testuo Fujie, Yokohama, all of Japan

[73] Assignee: Olympus Optical Company Limited, Tokyo, Japan

[21] Appl. No.: 914,728

[22] Filed: Jun. 12, 1978

Related U.S. Application Data

[63] Continuation of Ser. No. 764,289, Jan. 31, 1977, abandoned.

[30] Foreign Application Priority Data

Feb. 6, 1976 [JP] Japan .............................. 51-12745[U]

[51] Int. Cl.² .......................... G01B 3/18; G01B 7/02
[52] U.S. Cl. ................................. 33/166; 33/DIG. 3
[58] Field of Search ............ 33/125 A, 125 C, 164 R, 33/166, 170, DIG. 3; 250/237 G

[56] References Cited

U.S. PATENT DOCUMENTS

| | | | |
|---|---|---|---|
| 3,482,321 | 12/1969 | Inshaw | 33/166 |
| 3,686,766 | 8/1972 | Matumoto | 33/166 |
| 3,877,149 | 4/1975 | Masuda | 33/166 |
| 3,995,156 | 11/1976 | Angersbach et al. | 250/237 G |

Primary Examiner—Richard R. Stearns
Attorney, Agent, or Firm—Toren, McGeady and Stanger

[57] ABSTRACT

A photoelectrically readable digital micrometer for precisely measuring a micro distance includes an outer ring having a micro internal thread, a spindle shaft having an external thread screwed into the internal thread, a disc-shaped scale plate having a scale provided around the periphery of the plate surface, the scale plate being secured to the spindle shaft perpendicular to the plate surface, a slidable ring slidably mounted on the outer ring and being slidable in the axial direction together with the spindle shaft, and a light source member and a light receiving member secured to the slidable ring and sandwiching the scale of said scale plate.

1 Claim, 1 Drawing Figure

U.S. Patent
Aug. 26, 1980
4,218,823
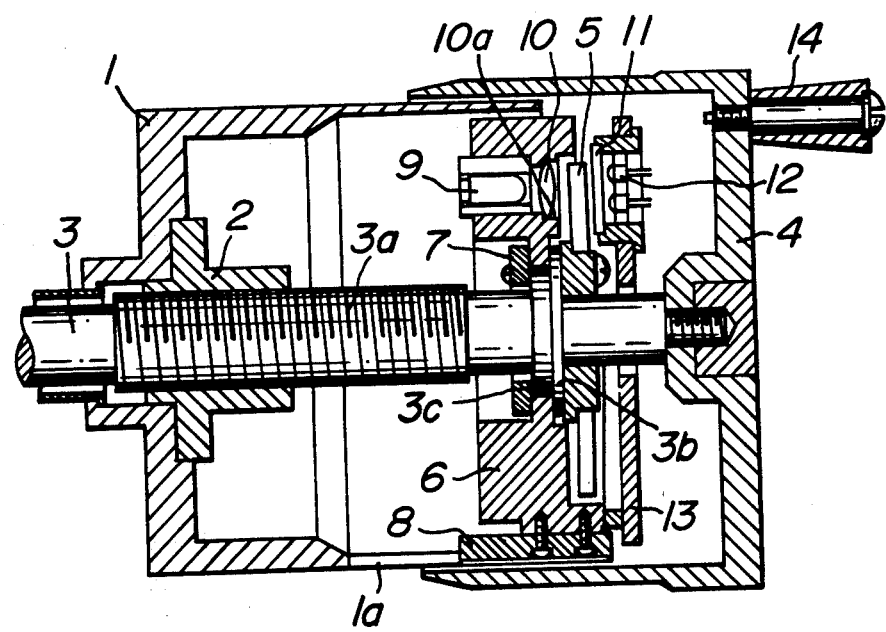

DIGITAL MICROMETER

This is a continuation of application Ser. No. 764,289, now abandoned, filed on Jan. 31, 1977.

BACKGROUND OF THE INVENTION

1. Field of the Invention

The present invention relates to a photoelectrically readable digital micrometer for precisely measuring a micro distance.

2. Description of the Prior Art

One known micrometer uses a method of reading a scale provided in a micrometer drum in case of measurement, so that such micrometer is troublesome for use and has disadvantages such as taking time for measurement and the like. For eliminating this disadvantage, there has been known a digital micrometer, wherein an operation handle, provided for rotating a spindle shaft in case of measurement, is secured to an integrally movable scale plate, and a light source and a light receiving element are arranged by sandwiching the scale plate so as to slide to an outer ring of the micrometer together with the operation handle.

According to this kind of digital micrometer, the value measured is displayed as a digital amount in a counter, and it is very convenient because the value can be immediately read.

In this kind of micrometer, however, if the operation handle and the scale plate are not precisely vertically arranged relative to the spindle shaft, an error is caused in measurement, and particularly, errors between the operation handle and the scale plate accumulate and result in a large error, so that in case of manufacturing such a micrometer, even a small deviation cannot be permitted, and as a result, the manufacture is very troublesome and expensive.

SUMMARY OF THE INVENTION

An object of the present invention is to eliminate the above described defects of the conventional digital micrometer.

Another object of the present invention is to provide a digital micrometer having such a construction in which a scale plate is directly secured to a spindle shaft.

A further object of the present invention is to provide a digital micrometer which has high precision and is very easily manufactured.

According to the present invention the digital micrometer comprises an outer ring having a micro internal thread, a spindle shaft having an external thread screwed into the internal thread, a disc-shaped scale plate having a scale provided around the periphery of the plate surface, the scale plate is secured to the spindle shaft perpendicular to the plate surface, a slidable ring is slidably mounted on the outer ring and is slidable in the axial direction together with the spindle shaft, and a light source member and a light receiving member are secured to the slidable ring and sandwich the scale of the scale plate.

BRIEF DESCRIPTION OF THE DRAWING

The drawing is a cross-sectional view of the digital micrometer according to the present invention.

DESCRIPTION OF THE PREFERRED EMBODIMENT

Referring to the drawing one embodiment of a digital micrometer according to the present invention is shown. In the drawing, reference numeral 1 is an outer ring provided with an internal thread 2 therein, numeral 3 is a spindle shaft having an external thread 3a screwed into the internal thread 2, numeral 4 is an operation handle secured to one end of the spindle shaft 3 and engaged with part of the outer peripheral surface of the outer ring 1, numeral 5 is a scale plate having a disc-shape and a scale radially formed around a peripheral portion of the plate thereof and secured to the portion shown by reference numeral 3b of a flange formed on the spindle shaft 3. Reference numeral 6 is a slidable ring freely inserted in the portion shown by reference numeral 3c of the flange of the spindle shaft 3 and sandwiched between the flange 3b and a junk ring 7 secured to the flange 3c. Reference numeral 8 is a key secured to the slidable ring 6, a part of which is positioned within a key groove 1a formed in the outer ring 1. Reference numeral 9 is an illuminating bulb, and numeral 10 is a lens, both being fixed in an opening 10a formed in the slidable ring 6. Reference numeral 11 is a slit plate and numeral 12 is a light receiving element, both being held at predetermined positions by means of a holding plate 13. Further, this holding plate 13 has a certain space from the slidable ring 6 and is secured to the slidable ring 6 by a proper means for making the plate surface thereof vertical to the spindle shaft 3. A light source member consisting of the illuminating bulb 9 and the lens 10 and a light receiving member consisting of the slit plate 11 and the light receiving element 12 are opposed to each other by inserting the scale plate 5 therebetween. In addition, reference numeral 14 is a knob for the operation handle.

The action of the micrometer according to the present invention having the aforementioned construction will be explained hereinafter. At first, if the operation handle 4 is rotated for measurement, the spindle shaft 3 is moved as well as the known micrometer. In this case, the scale plate 5 is secured to the flange 3b of the spindle shaft 3, so that the scale plate 5 is rotated with the spindle shaft 3 in the axial direction. On the other hand, the slidable ring 6 is moved in the axial direction of the outer ring 1, i.e., the direction of the spindle shaft, by means of the key 8 and the key groove 1a, but the slidable ring is not rotated, so that it can move by movement of the spindle shaft 3. Therefore, the light source member and the light receiving member secured to the slidable ring 6 are moved together with the spindle shaft 3 as they maintain the positional relation as illustrated.

As described above, a value corresponding to the rotating amount of the scale plate can be digitally detected on the basis of a signal from the light receiving member.

As explained above, according to the digital micrometer of the present invention, the value measured can be read as a digital amount, so that the reading is very simple, and the scale plate is directly secured to the spindle shaft for detecting the rotating amount, so that there is no accumulative addition of errors caused by the operation ring, the scale plate and the like to the spindle shaft, which is often caused in the prior micrometers, and as a result, only the processing of a spindle shaft having high precision makes it possible to measure the value with very high precision without any complicated construction such as an adjustment mechanism and the like.

What is claimed is:

1. A digital micrometer comprising an outer ring having a micro internal thread, an axially elongated spindle shaft extending through said outer ring and having an external thread thereon screwed into said internal thread, said external thread extending for only a portion of the axial length of said spindle shaft, said spindle shaft having a flange portion extending radially outwardly therefrom and spaced axially from the external thread thereon, said flange portion formed integrally with said spindle shaft, an annular disc-shaped scale plate extending transversely of said spindle shaft and comprising a radially inner portion and a radially outer portion and said outer portion having a scale extending around a portion of transversely extending surface thereof adjacent the periphery of said plate, the scale on said outer portion is located in a plane axially adjacent to said flange portion and is positioned on the opposite side of said flange portion from said external thread, the radially inner portion of the scale plate is rigidly secured directly to the flange portion of said spindle shaft with the surface of said scale being perpendicular to the spindle shaft so that said spindle shaft, said flange portion and said scale plate rotate as a unit, a slidable ring extending transversely of said spindle shaft and mounted on and encircling said spindle shaft so that said spindle shaft can rotate relative to said slidable ring, said slidable ring located adjacent to the location of the securement of said scale plate to said flange portion with at least an axially extending portion of said slidable ring located between said flange portion and the external thread on said spindle shaft, said outer ring having a key groove formed therein extending in the axial direction of said spindle shaft with said key groove extending at least for the axial dimension of said flange along said spindle shaft, a key secured directly to said slidable ring, said key slidably interengaged in said key groove for preventing rotation of said slidable ring about the axis of said spindle shaft while permitting relative sliding movement in the axial direction of said spindle shaft between said outer ring and said slidable ring, and a light source member and a light receiving member secured to said slidable ring and each positioned on an opposite side of said scale plate and spaced apart in the axial direction of said spindle shaft for sandwiching the scale of said scale plate.

* * * * *